United States Patent
Humphreys et al.

(10) Patent No.: US 7,384,260 B2
(45) Date of Patent: Jun. 10, 2008

(54) PINCH BAR AND PARISON SEPARATION METHOD

(75) Inventors: Dave Humphreys, Wrexham (GB); Earle Ellis, York, PA (US); William Richer, York, PA (US); Robert Stoolmaker, York, PA (US)

(73) Assignee: Graham Packaging Company, L.P., York, PA (US)

( * ) Notice: Subject to any disclaimer, the term of this patent is extended or adjusted under 35 U.S.C. 154(b) by 803 days.

(21) Appl. No.: 10/705,501

(22) Filed: Nov. 12, 2003

(65) Prior Publication Data

US 2005/0098922 A1    May 12, 2005

(51) Int. Cl.
*B29C 49/36*    (2006.01)
(52) U.S. Cl. ..................... 425/531; 425/540
(58) Field of Classification Search ............. 425/531, 425/540
See application file for complete search history.

(56) References Cited

U.S. PATENT DOCUMENTS

| | | | |
|---|---|---|---|
| RE23,564 E * | 10/1952 | Hobson | 264/524 |
| 3,428,722 A * | 2/1969 | Chittenden et al. | 264/526 |
| 3,797,985 A | 3/1974 | Garver | |
| 3,936,263 A * | 2/1976 | Avery et al. | 425/296 |
| 5,021,209 A | 6/1991 | Dickinson et al. | |
| 5,454,708 A | 10/1995 | Boenig et al. | |
| 2002/0136794 A1 | 9/2002 | Cargile et al. | |

FOREIGN PATENT DOCUMENTS

DE    85 16 396 U1    3/1987

* cited by examiner

*Primary Examiner*—Suzanne E. McDowell
(74) *Attorney, Agent, or Firm*—Knoble Yoshida & Dunleavy, LLC

(57) ABSTRACT

A parison pinching and separating system for attaching to first and second mold halves is disclosed. Each mold half has first and second cavities. The system includes a first pinch bar for attaching to the first cavity of the first mold half, a first pinch bar for attaching to the second cavity of the first mold half, a second pinch bar for attaching to the first cavity of the second mold half, and a second pinch bar for attaching to the second cavity of the second mold half. Each pinch bar has a surface and a protrusion that extends from the surface. The protrusions of the pinch bars associated with first cavity are positioned for pinching a parison when the first and second mold halves close. The protrusion associated with the second cavity are positioned for pinching a parison when the first and second mold halves close.

12 Claims, 5 Drawing Sheets

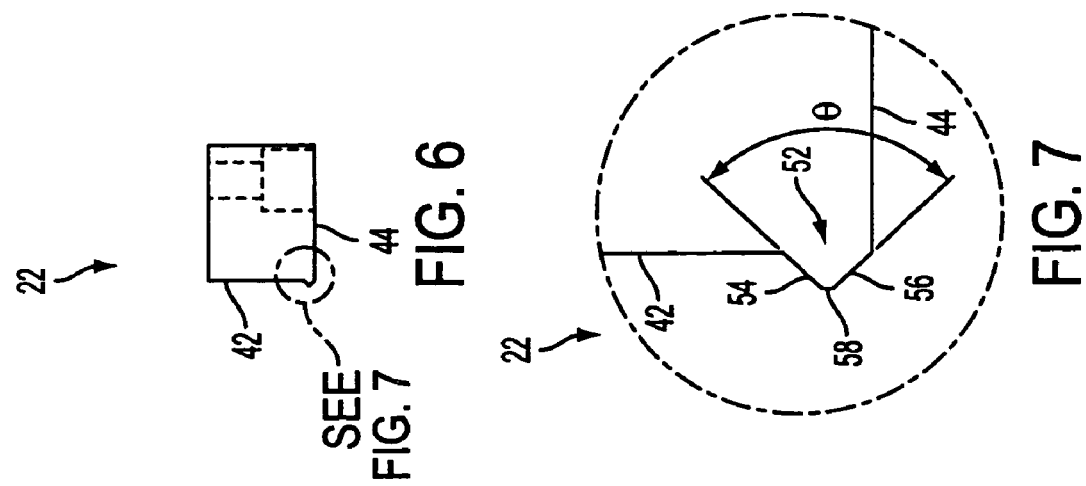
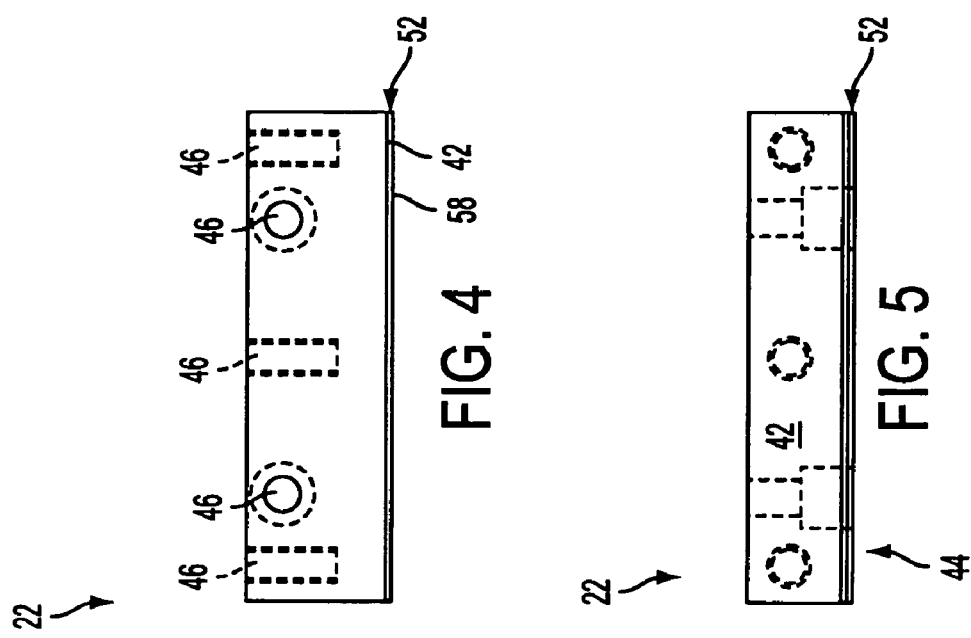

PINCH BAR AND PARISON SEPARATION METHOD

BACKGROUND OF THE INVENTION

1. Field of the Invention

The present invention relates generally to the manufacture of plastic containers, and more particularly to the use of substantially flat surfaces on pinch bars to separate parisons used in forming containers manufactured in a dual parison blow-molding machine.

2. Related Art

Cut-off knife systems are currently used to cut extruded polymer tubes, or parisons, during the manufacture of plastic bottles. The cut-off knife systems use knives mounted to blow molds to cut the parison in the same fashion as scissors.

During the production of plastic bottles, for example high density polyethylene (HDPE) bottles, on a high-speed rotary wheel machine, problems are encountered when cutting the parison using the cut-off knife systems. If and when the cut-off knives are not perfectly spaced or sharp, the separation of the parison between two adjacent molds is not complete. Additionally, a dull knife or nicked knife can result in an incomplete cut and form a stringer, which forms a membrane-like connection between the molds. Stringers can cause problems when the bottles drop from the molds. For example, if the stringer does not break when the bottle drops, the bottles get thrown off balance and can fall onto the cleated conveyor, out of location and cause jam-ups downstream.

Further, in cut-off knife systems, the knives are mounted to the exterior portion of the mold that is located between adjacent molds. This arrangement results in large gaps between adjacent molds. When there are large gaps between adjacent molds, there is more heated parison present between the adjacent molds, which can also result in stringers.

In dual parison blow-molding, the problem of stringers is exacerbated because of the weight of the bottles. Bottles produced from dual parison systems tend to be light and the stringers are more likely to cause the bottles to fall out of location because the stringers can cock the bottle as it falls onto the cleated conveyor.

What is needed then is an improved method and apparatus for pinching off parison to separate parisons from adjacent molds to reduce the likelihood that stringers will occur.

BRIEF SUMMARY OF THE INVENTION

In one exemplary embodiment of the invention, a parison pinching and separating system for attaching to first and second mold halves is disclosed. Each mold half has first and second cavities. The system includes a first pinch bar for attaching to the first cavity of the first mold half. The first pinch bar of the first cavity of the first mold half has a surface and a protrusion that extends from the surface. The system also includes a first pinch bar for attaching to the second cavity of the first mold half. The first pinch bar of the second cavity of the first mold half has a surface and a protrusion that extends from the surface. The system further includes a second pinch bar for attaching to the first cavity of the second mold half. The second pinch bar of the first cavity of the second mold half has a surface and a protrusion that extends from the surface. The system still further includes a second pinch bar for attaching to the second cavity of the second mold half. The second pinch bar of the second cavity of the second mold half has a surface and a protrusion that extends from the surface. The protrusion of the first pinch bar of the first cavity of the first mold half and the protrusion of the second pinch bar of the first cavity of the second mold half are positioned for pinching a parison when the first and second mold halves close. The protrusion of the first pinch bar of the second cavity of the first mold half and the protrusion of the second pinch bar of the second cavity of the second mold half are positioned for pinching a parison when the first and second mold halves close.

In another exemplary embodiment of the invention, an apparatus for pinching and separating parison is disclosed. The apparatus includes a mold having first and second halves. Each mold half has first and second cavities. The system includes a first pinch bar attached to the first cavity of the first mold half. The first pinch bar of the first cavity of the first mold half has a surface and a protrusion that extends from the surface. The system also includes a first pinch bar attached to the second cavity of the first mold half. The first pinch bar of the second cavity of the first mold half has a surface and a protrusion that extends from the surface. The system further includes a second pinch bar for attached to the first cavity of the second mold half. The second pinch bar of the first cavity of the second mold half has a surface and a protrusion that extends from the surface. The system still further includes a second pinch bar attached to the second cavity of the second mold half. The second pinch bar of the second cavity of the second mold half has a surface and a protrusion that extends from the surface. The protrusion of the first pinch bar of the first cavity of the first mold half and the protrusion of the second pinch bar of the first cavity of the second mold half are positioned for pinching a parison when the first and second mold halves close. The protrusion of the first pinch bar of the second cavity of the first mold half and the protrusion of the second pinch bar of the second cavity of the second mold half are positioned for pinching a parison when the first and second mold halves close.

In yet another exemplary embodiment of the invention, a method for pinching parison is disclosed. The method includes the steps of extruding parison between mold halves and pinching the parison between protrusions extending from opposing pinch bars by moving the mold halves toward each other, such that the parison is pinched between a flat surface on each protrusion.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical, functionally similar, and/or structurally similar elements.

FIG. 4 depicts an exemplary embodiment of a pinch bar according to the present invention;

FIG. 5 depicts an exemplary embodiment of a pinch bar according to the present invention;

FIG. 6 depicts an exemplary embodiment of a pinch bar according to the present invention;

FIG. 7 depicts an exemplary embodiment of a pinch bar according to the present invention.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
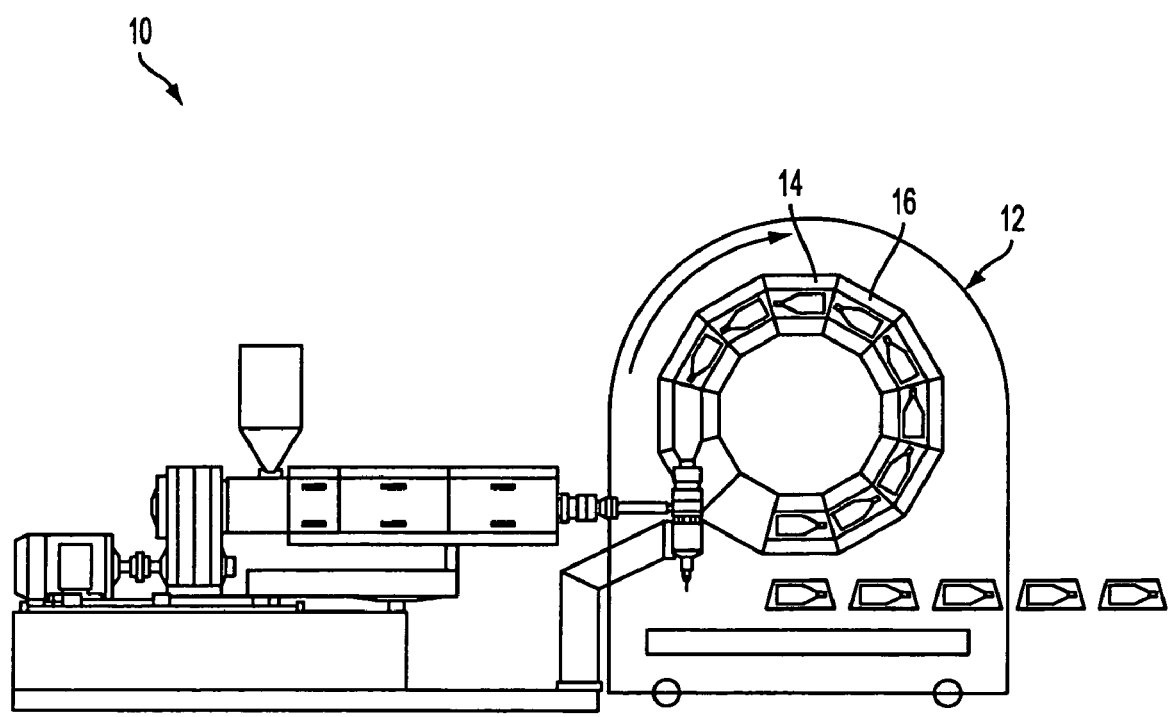
FIG. 1 depicts an exemplary embodiment of a rotary wheel for implementing the present invention.
Figure 3:
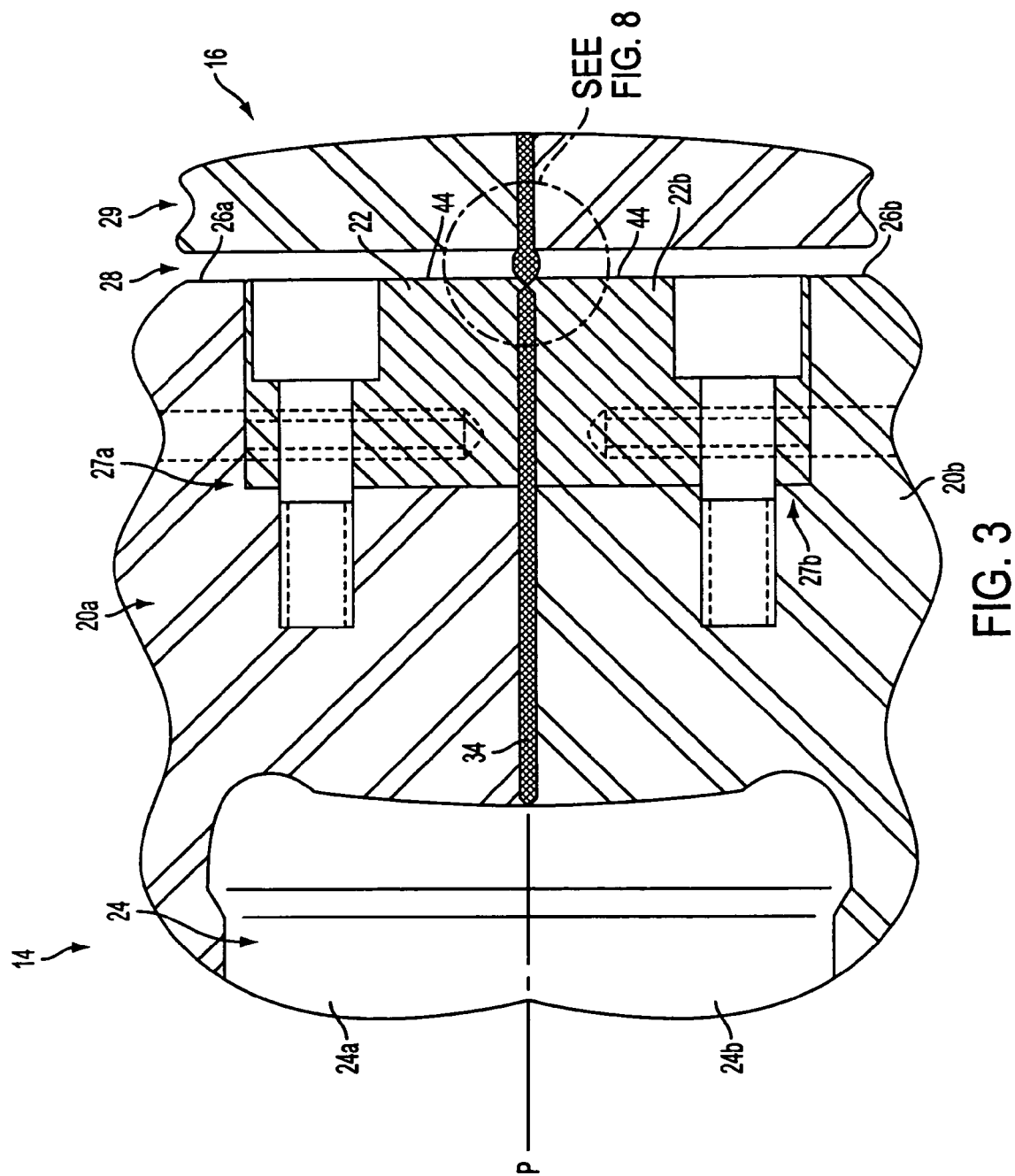
FIG. 3 depicts an exemplary embodiment of a pair of opposing pinch bars according to the present invention.

Plastic containers, such as, e.g., HDPE bottles, can be produced on high-speed molding machines. As shown in FIG. 1, high-speed molding machine 10 can have rotary wheel 12 for carrying a series of adjacent molds 14, 16 on a rotary wheel 12. Molds 14, 16 can have a top tail section a and bottom tail section. When molds 14, 16 are positioned on rotary wheel 12, the top tail section of a mold 14 is adjacent to the bottom tail section of an adjacent, preceding mold 16. Molds 14, 16 can have mold halves 20a, 20b (as shown in FIG. 3). Mold halves 20a, 20b can attach to the rotary wheel 12 by vertical support members (not shown).

As will be appreciated by those skilled in the art, a parison (not shown) can be formed by upwardly extruding a thermoplastic material and positioning the parison between separated mold halves 20a, 20b of the molds of rotary wheel 12. Mold halves 20a, 20b are then closed around the parison and air is injected into the parison inside a mold causing the parison to expand and press the outer surface of the parison against the inner surface of the mold to form the plastic bottle. When the plastic bottle thusly formed cools, the mold is opened and the plastic bottle is ejected from the mold.

In high-speed molding machines, there can be one or more container forming cavities in a mold; each cavity being fed with a parison. Where, for example, two container forming cavities are present in a single mold, each cavity is in line with a separate parison injector and each cavity is fed by a different parison. This two-cavity blow-molding system is known as a dual parison blow-molding system. Each cavity in a dual parison blow-molding system can be used to form more than one connected container. For example, if each cavity forms two connected containers, each mold will produce four containers per mold when the two connected containers from each cavity are separated. When each cavity forms more than one container, the connected containers that are ejected from the mold can be termed a "log." In such a system where two container forming cavities are present, the cavity closest to the center of the rotary wheel can be referred to as the inboard cavity, while the cavity furthest from the center of the mold can be referred to as the outboard cavity.

Dual parison blow-molding is often used to produce narrow containers and those containers tend to be light. As a result, separating the parisons between two adjacent molds 14, 16 is desirable for efficient operation. Faulty separation can result in the presence of a membrane-like connection or stringer between adjacent molds 14, 16. To avoid the presence of stringers, the separation of the parison between adjacent molds 14, 16 must be substantially complete. A pair of opposing pinch bars according to the present invention can be used to effect complete separation of each of the parisons in a dual parison blow-molding system.

In a dual-parison system, because of the lightweight nature of the containers and container logs and the increased need for proper orientation of the logs as the logs are removed from the mold and conveyed through additional process steps such as cutting to separate the two containers from the container log and trimming, separation of parison is even more important than in a one-cavity system. In such a case where separation is critical, it would be expected that using a sharp surface to cleanly cut the parison would be superior to a pinching method. Consequently, persons having ordinary skill in the art have avoided using pinch bars to separate the parison in a dual parison blow-molding system in favor of a cut-off knife system. However, it was unexpectedly found that using a pinching system to separate parisons in a dual parison blow-molding machine produced significantly little to no stringers and reduced the amount of jam-ups downstream as compared to the use of a sharp cut-off knife system.

Figure 2:
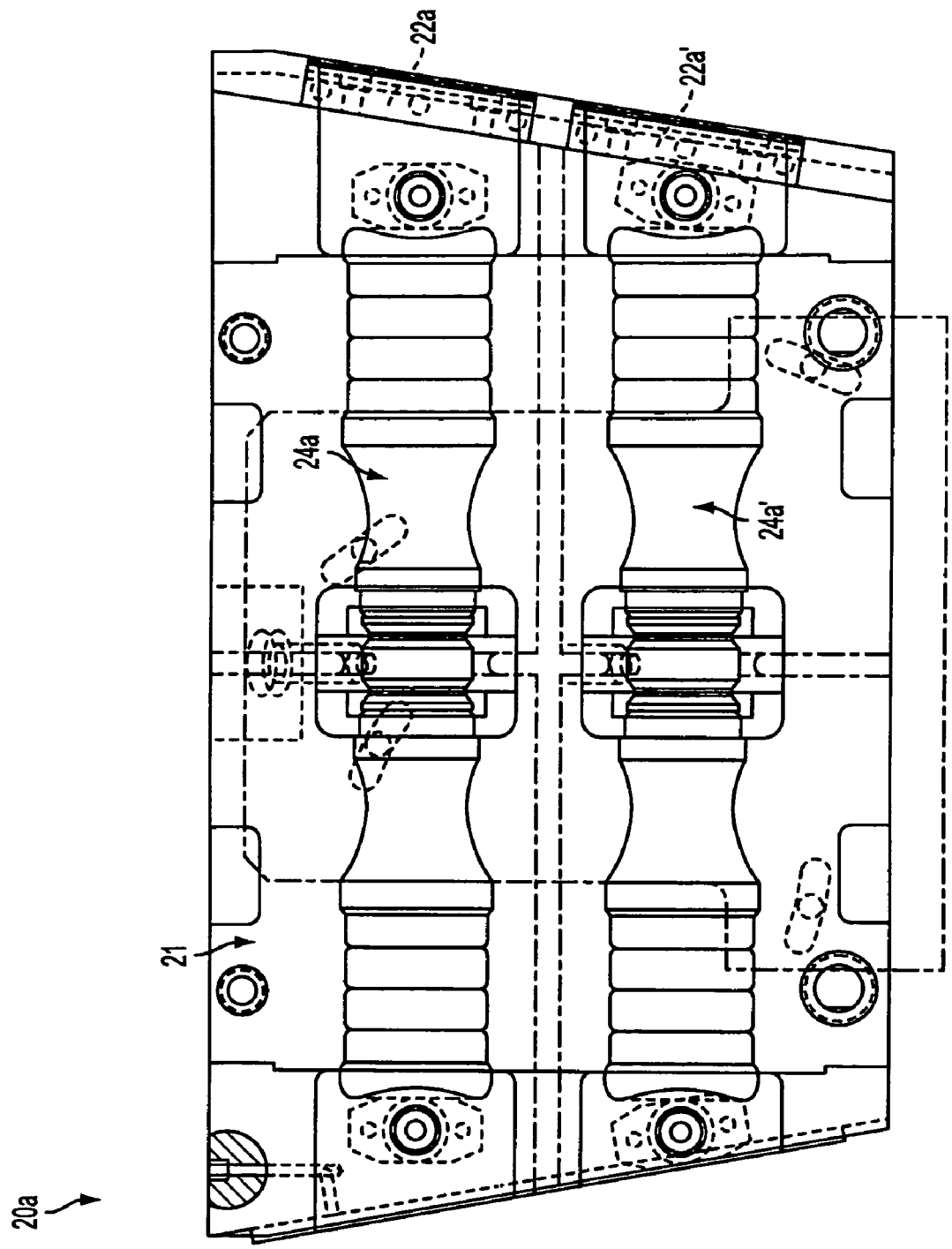
FIG. 2 depicts an exemplary embodiment of a mold half according to the present invention.

FIG. 2 illustrates an exemplary inner mold face 21 of an exemplary mold half 20a useful in a dual parison system. Mold half 20a can mate with a complementary mold half 20b (not shown in FIG. 2) to form mold 14. Mold half 20a can have two pinch bars 22a, 22a', which can cooperate with pinch bars on the complementary mold half 20b, for pinching the parisons when mold halves 20a, 20b close.

FIG. 3 illustrates a cross-sectional view of an exemplary embodiment of adjacent molds 14, 16 that can be on rotary wheel 12 of a dual parison blow-molding machine. FIG. 3 illustrates mold halves 20a, 20b in the closed position. When mold halves 20a, 20b are closed, outboard cavity 24 is formed by the respective outboard cavity halves 24a and 24b, as shown in FIG. 3. Similarly, when mold halves 20a and 20b are closed, inboard cavity 24' is formed by inboard cavity halves 24a' and 24b' (not shown).

In dual parison blow-molding, there can be two cavities per mold. Outboard cavity 24 can be composed of outboard cavity half 24a of mold half 20a and outboard cavity half 24b of mold half 20b. Similarly, inboard cavity 24' can be composed of inboard cavity half 24a' of mold half 20a and inboard cavity half 24b' of mold half 20b. When mold halves 20a, 20b come together, the outboard cavity halves 24a, 24b close to form outboard cavity 24 and inboard cavity halves 24a', 24b' close to form inboard cavity 24'.

Outboard cavity 24 can be associated with a pair of pinch bars 22a, 22b and inboard cavity 24' can be associated with a pair of pinch bars 22a' and 22b'. Each pinch bar 22a, 22a' in a mold half 20a can mate with a complementary opposing pinch bar 22b, 22b', respectively, in the complementary mold half 20b. Opposing pinch bars on each mold half can be located at top tail section 28 of mold 14. As shown in FIG. 2, outboard cavity half 24a and inboard cavity half 24a' can each have one pinch bar 22a, 22a' of the opposing pair per mold half.

As shown in FIG. 3, top tail section 28, which can include opposing pinch bars 22a, 22b that are associated with outboard cavity 24, can be adjacent to bottom tail section 29 of preceding mold 16. For illustrative purposes only, FIG. 3 only shows a cross-sectional view of outboard cavity 24 and opposing pinch bars 22a, 22b associated with outboard cavity 24. It will be understood by a person having ordinary skill in the art that the arrangement shown in FIG. 3 can be the same for inboard cavity 24' and opposing pinch bars 22a', 22b'. Further, it should be noted that the second pair of opposing pinch bars 22a', 22b' of inboard cavity 24' can be aligned in the same manner as pinch bars 22a, 22b when mold halves 20a, 20b are closed.

As mold halves 20a, 20b close around the parisons, pairs of opposing pinch bars 22a, 22b; 22a', 22b' can pinch off the parisons in the outboard cavity 24 and inboard cavity 24', so as to cause a substantially complete separation of each parison from a first mold 14 from the parison of the adjacent mold 16 in rotary wheel 12.

When mold halves 20a, 20b close, portions of each inner mold face 21 of the mold halves 20a, 20b can make contact. The plane in which each inner mold face 21 of the mold halves 20a, 20b make contact can be referred to as parting line P. Thus, it will be understood by a person having ordinary skill in the art that when the mold halves 20a, 20b are closed, each cavity 24 and 24' is set back from parting line P.

As shown in FIG. 3, outboard cavity 24 can be associated with a flash pocket 34. As will be understood by one having ordinary skill in the art, flash pocket 34 can be used to receive the flattened parison when mold halves 20a and 20b close. Mold halves 20a and 20b can each have recesses 27a, 27b in top tail section 28 to receive pairs of opposing pinch bars 22a, 22b, respectively. Recesses 27a, 27b can be of complementary shape and size as pinch bars 22a, 22b. Additionally, the top tail section 28 of each mold half 20a, 20b can have outer surfaces 26a, 26b. When pinch bars 22a, 22b are set into recesses 27a, 27b, respectively, the exterior surfaces 44 of each pinch bar can be substantially coplanar with the outer surfaces 26a, 26b of the mold halves.

Referring now to FIGS. 4-7, an exemplary pinch bar 22 according to the present invention is described. FIG. 4 shows a surface that is opposite exterior surface 44 of pinch bar 22. FIG. 5 shows flash contact surface 42 and protrusion 52. FIG. 6 is an end view of a pinch bar 22. FIG. 7 is a detailed end view of protrusion 52 of a pinch bar 22.

For purposes of discussion, only one exemplary pinch bar 22 is described herein. It should be noted that all pinch bars 22a, 22b, 22a', 22b' can be substantially identical to pinch bar 22 as shown in FIGS. 4-7. Alternatively, each of the pinch bars may be shaped differently to fit in a particular recess 27. Pinch bar 22 can have a flash contact surface 42 and an exterior surface 44. When mounted in the recess 27 of a mold half, flash contact surface 42 can be sized to be substantially coplanar with a surface defining flash pocket 34 or any other surface that is substantially parallel to inner mold face 21. Similarly, exterior surface 44 can be substantially coplanar with outer surfaces 26a, 26b of each respective mold half 20a, 20b.

Pinch bar 22 can have apertures 46 to receive fasteners (not shown), such as, e.g., bolts, screws or the like. Apertures 46 can be counter-bored such that, for example, the fasteners can be inserted into the apertures from a surface that is opposite flash contact surface 42 and exterior surface 44. Pinch bar 22 can have any number of apertures necessary to secure pinch bar 22 to a mold half. For example, as shown in FIGS. 4 and 5, pinch bar 22 can have three apertures 46 for fastening in a direction substantially perpendicular to pinch bar flash contact surface 42 and two apertures 46 for fastening in a direction substantially perpendicular to exterior surface 44. Although pinch bar 22a can have, for example, five apertures for fastening pinch bar 22 to a mold half, it is noted the other methods for attaching pinch bar 22 can be employed, such as, e.g., using an adhesive, a key system, or dowels. Additionally, apertures 46 can be threaded for receiving mounting bolts or the like.

As shown in FIGS. 6 and 7, pinch bar 22 can have protrusion 52 that can extend along flash contact surface 42 in a direction that is substantially parallel to outer surfaces 26 when pinch bar 22 is attached to a mold half. The size of protrusion 52 can depend upon the depth of flash pocket 34. For example, protrusion 52 can extend, between about 0.020-0.040 inches, such as 0.032 inches, above flash contact surface 42. Additionally, protrusion 52 can be substantially coplanar with inner mold face 21 and/or protrusion can extend about 0.0005-0.005 inches above parting line P and/or inner mold face 21. Protrusion 52 can have two sides 54, 56 and flat surface 58. Sides 54, 56 can form an angle θ, which can be from 0° to 180°. In an exemplary embodiment, sides 54, 56 can be substantially perpendicular, thus forming an angle θ of, for example, 90°. A person having ordinary skill in the art will recognize that these dimensions may vary depending on the characteristics of the container, such as, e.g., size and weight.

Flat surface 58 can be substantially parallel to pinch bar flash contact surface 42. Additionally, flat surface 58 can intersect side surfaces 54, 56 in such a manner to create a cross-section of protrusion 52 in the shape of a truncated triangle. In an exemplary embodiment, flat surface can have a width of 0.008-0.010 inches.

Figure 8:
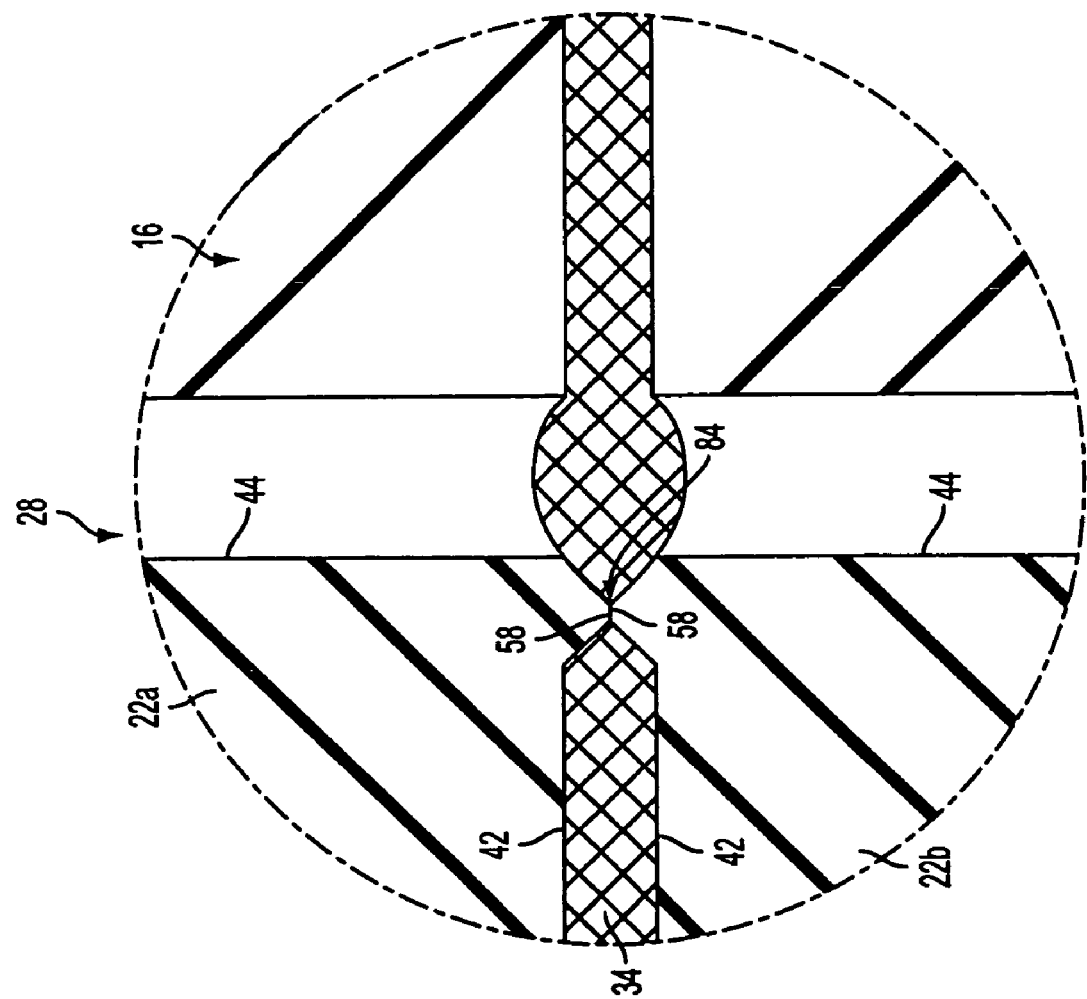
FIG. 8 depicts an exemplary embodiment of a pair of opposing pinch bars according to the present invention.

In light of the above description relating to the pairs of opposing pinch bars, it should be apparent to one having ordinary skill in the art that a method for separating a parison by pinching can be provided according to the invention. With reference to FIG. 8 and the above description regarding the formation of plastic containers, as mold halves 20a, 20b close, opposing pinch bars 22a, 22b come together. When opposing pinch bars come together, opposing flat surfaces 58 of opposing pinch bars can align with each other to form pinching location 84. At pinching location 84, with the ordinary compression causing mold halves 20a, 20b to close, for example, protrusions 52 can break through a parison such that flat surfaces 58 can touch each other. Additionally, when opposing pinch bars are closed at pinching point 84, protrusions on opposing pinch bars can seal off flash pocket 34 at top tail section 28 of mold 14.

Unlike the knife cut-off edges of conventional parison separation systems, flat surfaces 52 of opposing pinch bars 22a, 22a advantageously pinch the plastic parison without stringers for longer periods because the flat surfaces are less easily nicked, dulling is not a problem, and wear is substantially reduced. Additionally, because the pinch bars can be inserted into recesses in the molds, there is less of a gap between adjacent molds. The smaller gap result in less heated plastic between the molds, which also reduces the likelihood of stringers.

Further, the pinching system and method of the present invention increases productivity because the pinch bars do not have to be replaced as often as knife blades and the inclusion of the pinch bars into the molds reduces the number of moving parts required by knife cut-off systems. Additionally, the absence of sharp edges on the pinch bars provides for safer operation and replacement.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A parison pinching system for attaching to first and second mold halves, each mold half having first and second cavities, the system comprising:
    a first pinch bar for attaching to the first cavity of the first mold half, the first pinch bar of the first cavity of the first mold half having a surface and a protrusion that extends from the surface;
    a first pinch bar for attaching to the second cavity of the first mold half, the first pinch bar of the second cavity of the first mold half having a surface and a protrusion that extends from the surface;
    a second pinch bar for attaching to the first cavity of the second mold half, the second pinch bar of the first cavity of the second mold half having a surface and a protrusion that extends from the surface; and
    a second pinch bar for attaching to the second cavity of the second mold half, the second pinch bar of the second cavity of the second mold half having a surface and a protrusion that extends from the surface,
    wherein the protrusion of the first pinch bar of the first cavity of the first mold half and
    the protrusion of the second pinch bar of the first cavity of the second mold half are positioned for pinching a parison when the first and second mold halves close, and
    the protrusion of the first pinch bar of the second cavity of the first mold half and the protrusion of the second pinch bar of the second cavity of the second mold half are positioned for pinching a parison when the first and second mold halves close, and
    wherein each of the protrusions further comprises: a first side surface; a second side surface; and a flat surface that intersects the first and second side surfaces
    wherein each flat surface is substantially parallel to an inner mold face of each pinch bar's respective mold half.

2. A parison pinching system for attaching to first and second mold halves, each mold half having first and second cavities, the system comprising:
    a first pinch bar for attaching to the first cavity of the first mold half the first pinch bar of the first cavity of the first mold half having a surface and a protrusion that extends from the surface;
    a first pinch bar for attaching to the second cavity of the first mold half the first pinch bar of the second cavity of the first mold half having a surface and a protrusion that extends from the surface;
    a second pinch bar for attaching to the first cavity of the second mold half the second pinch bar of the first cavity of the second mold half having a surface and a protrusion that extends from the surface; and
    a second pinch bar for attaching to the second cavity of the second mold half, the second pinch bar of the second cavity of the second mold half having a surface and a protrusion that extends from the surface,
    wherein the protrusion of the first pinch bar of the first cavity of the first mold half and
    the protrusion of the second pinch bar of the first cavity of the second mold half are positioned for pinching a parison when the first and second mold halves close, and
    the protrusion of the first pinch bar of the second cavity of the first mold half and the protrusion of the second pinch bar of the second cavity of the second mold half are positioned for pinching a parison when the first and second mold halves close, and
    wherein each of the protrusions further comprises: a first side surface; a second side surface; and a flat surface that intersects the first and second side surfaces, and
    wherein each flat surface is substantially coplanar to or extends beyond an inner mold face of each pinch bar's respective mold half.

3. A parison pinching system for attaching to first and second mold halves, each mold half having first and second cavities, the system comprising:
    a first pinch bar for attaching to the first cavity of the first mold half, the first pinch bar of the first cavity of the first mold half having a surface and a protrusion that extends from the surface;
    a first pinch bar for attaching to the second cavity of the first mold half the first pinch bar of the second cavity of the first mold half having a surface and a protrusion that extends from the surface;
    a second pinch bar for attaching to the first cavity of the second mold half the second pinch bar of the first cavity of the second mold half having a surface and a protrusion that extends from the surface; and
    a second pinch bar for attaching to the second cavity of the second mold half the second pinch bar of the second cavity of the second mold half having a surface and a protrusion that extends from the surface,
    wherein the protrusion of the first pinch bar of the first cavity of the first mold half and
    the protrusion of the second pinch bar of the first cavity of the second mold half are positioned for pinching a parison when the first and second mold halves close, and
    the protrusion of the first pinch bar of the second cavity of the first mold half and the protrusion of the second pinch bar of the second cavity of the second mold half are positioned for pinching a parison when the first and second mold halves close, and
    wherein each of the protrusions further comprises: a first side surface; a second side surface; and a flat surface that intersects the first and second side surfaces, and
    wherein a cross-section of each of the protrusions is a truncated triangle.

4. A parison pinching system for attaching to first and second mold halves, each mold half having first and second cavities, the system comprising:
    a first pinch bar for attaching to the first cavity of the first mold half the first pinch bar of the first cavity of the first mold half having a surface and a protrusion that extends from the surface;
    a first pinch bar for attaching to the second cavity of the first mold half the first pinch bar of the second cavity of the first mold half having a surface and a protrusion that extends from the surface;
    a second pinch bar for attaching to the first cavity of the second mold half, the second pinch bar of the first cavity of the second mold half having a surface and a protrusion that extends from the surface; and
    a second pinch bar for attaching to the second cavity of the second mold half the second pinch bar of the second cavity of the second mold half having a surface and a protrusion that extends from the surface, wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half are positioned for pinching a parison when the first and second mold halves close, and wherein the system is a component of a dual parison pinching system.

5. A parison pinching system for attaching to first and second mold halves, each mold half having first and second cavities, the system comprising:
a first pinch bar for attaching to the first cavity of the first mold half, the first pinch bar of the first cavity of the first mold half having a surface and a protrusion that extends from the surface;
a first pinch bar for attaching to the second cavity of the first mold half the first pinch bar of the second cavity of the first mold half having a surface and a protrusion that extends from the surface;
a second pinch bar for attaching to the first cavity of the second mold half the second pinch bar of the first cavity of the second mold half having a surface and a protrusion that extends from the surface; and
a second pinch bar for attaching to the second cavity of the second mold half the second pinch bar of the second cavity of the second mold half having a surface and a protrusion that extends from the surface,
wherein the protrusion of the first pinch bar of the first cavity of the first mold half and
the protrusion of the second pinch bar of the first cavity of the second mold half are positioned for pinching a parison when the first and second mold halves close, and the piotrusion of the first pinch bar of the second cavity of the first mold half and the protrusion of the second pinch bar of the second cavity of the second mold half are positioned for pinching a parison when the first and second mold halves close, and
wherein each of the protrusions further comprises: a first side surface; a second side surface; and a flat surface that intersects the first and second side surfaces, and wherein the flat surface has a width of about 0.008-0.010 inches.

6. The parison pinching system of claim 5, wherein the flat surface has a width of about 0.009 inches.

7. An apparatus comprising:
a mold having first and second halves;
a first pinch bar attached to the first cavity of the first mold half, the first pinch bar of the first cavity of the first mold half having a surface and a protrusion that extends from the surface;
a first pinch bar attached to the second cavity of the first mold half, the first pinch bar of the second cavity of the first mold half having a surface and a protrusion that extends from the surface;
a second pinch bar attached to the first cavity of the second mold half, the second pinch bar of the first cavity of the second mold half having a surface and a protrusion that extends from the surface; and
a second pinch bar attached to the second cavity of the second mold half the second pinch bar of the second cavity of the second mold half having a surface and a protrusion that extends from the surface,
wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half arc positioned for pinching a parison when the first and second mold halves close,
wherein each of the protrusions further comprises: a first side surface; a second side surface; and a flat surface that intersects the first and second side surfaces; and
wherein each flat surface is substantially parallel to an inner mold face of each pinch bar's respective mold half.

8. An apparatus comprising:
a mold having first and second halves;
a first pinch bar attached to the first cavity of the first mold half the first pinch bar of the first cavity of the first mold half having a surface and a protrusion that extends from the surface;
a first pinch bar attached to the second cavity of the first mold half the first pinch bar of the second cavity of the first mold half having a surface and a protrusion that extends from the surface;
a second pinch bar attached to the first cavity of the second mold half the second pinch bar of the first cavity of the second mold half having a surface and a protrusion that extends from the surface; and
a second pinch bar attached to the second cavity of the second mold half the second pinch bar of the second cavity of the second mold half having a surface and a protrusion that extends from the surface,
wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half are positioned for pinching a parison when the first and second mold halves close,
wherein each of the protrusions further comprises: a first side surface; a second side surface; and a flat surface that intersects the first and second side surfaces; and
wherein each flat surface is substantially coplanar to or extends beyond an inner mold face of each pinch bars respective mold half.

9. An apparatus comprising:
a mold having first and second halves;
a first pinch bar attached to the first cavity of the first mold half, the first pinch bar of the first cavity of the first mold half having a surface and a protrusion that extends from the surface;
a first pinch bar attached to the second cavity of the first mold half the first pinch bar of the second cavity of the first mold half having a surface and a protrusion that extends from the surface;
a second pinch bar attached to the first cavity of the second mold half the second pinch bar of the first cavity of the second mold half having a surface and a protrusion that extends from the surface; and
a second pinch bar attached to the second cavity of the second mold half, the second pinch bar of the second cavity of the second mold half having a surface and a protrusion that extends from the surface, wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half are positioned for pinching a parison when the first and second mold halves close, wherein each of the protrusions further comprises: a first side surface; a second side surface; and a flat surface that intersects the first and second side surfaces, and wherein a cross-section of each of the protrusions is a truncated triangle.

10. An apparatus comprising:

a mold having first and second halves;

a first pinch bar attached to the first cavity of the first mold half, the first pinch bar of the first cavity of the first mold half having a surface and a protrusion that extends from the surface;

a first pinch bar attached to the second cavity of the first mold half, the first pinch bar of the second cavity of the first mold half having a surface and a protrusion that extends from the surface;

a second pinch bar attached to the first cavity of the second mold half the second pinch bar of the first cavity of the second mold half having a surface and a protrusion that extends from the surface; and a second pinch bar attached to the second cavity of the second mold half the second pinch bar of the second cavity of the second mold half having a surface and a protrusion that extends from the surface, wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half are positioned for pinching a parison when the first and second mold halves close; and wherein the mold is a dual-parison mold.

11. An apparatus comprising:

a mold having first and second halves;

a first pinch bar attached to the first cavity of the first mold half, the first pinch bar of the first cavity of the first mold half having a surface and a protrusion that extends from the surface;

a first pinch bar attached to the second cavity of the first mold half, the first pinch bar of the second cavity of the first mold half having a surface and a protrusion that extends from the surface;

a second pinch bar attached to the first cavity of the second mold half the second pinch bar of the first cavity of the second mold half having a surface and a protrusion that extends from the surface; and a second pinch bar attached to the second cavity of the second mold half the second pinch bar of the second cavity of the second mold half having a surface and a protrusion that extends from the surface, wherein the protrusion of the first pinch bar of the first cavity of the first mold half and the protrusion of the second pinch bar of the first cavity of the second mold half are positioned for pinching a parison when the first and second mold halves close, and the protrusion of the first pinch bar of the second cavity of the first mold half and the protrusion of the second pinch bar of the second cavity of the second mold half are positioned for pinching a parison when the first and second mold halves close, wherein each of the protrusions further comprises: a first side surface; a second side surface; and a flat surface that intersects the first and second side surfaces; and wherein the flat surface has a width of about 0.008-0.010 inches.

12. The apparatus of claim 11, wherein the flat surface has a width of about 0.009 inches.

* * * * *